United States Patent
Atamli et al.

(10) Patent No.: US 12,417,278 B2
(45) Date of Patent: Sep. 16, 2025

(54) MAINTAINING DATA CONFIDENTIALITY IN SHARED COMPUTING ENVIRONMENTS

(71) Applicant: Mellanox Technologies, Ltd., Yokneam (IL)

(72) Inventors: Ahmad Atamli, Brighton (GB); Ilan Pardo, Ramat-Hasharon (IL); Miriam Menes, Tel Aviv (IL); Shahaf Shuler, Kibbutz Lohamei Hagetaot (IL); Meni Orenbach, Giv'atayim (IL); Uria Basher, Nehusha (IL); Gabi Liron, Yokneam Illit (IL)

(73) Assignee: Mellanox Technologies Ltd., Yokneam (IL)

( * ) Notice: Subject to any disclaimer, the term of this patent is extended or adjusted under 35 U.S.C. 154(b) by 272 days.

(21) Appl. No.: 18/084,964

(22) Filed: Dec. 20, 2022

(65) Prior Publication Data
US 2024/0202315 A1    Jun. 20, 2024

(51) Int. Cl.
*G06F 21/53* (2013.01)

(52) U.S. Cl.
CPC ........ *G06F 21/53* (2013.01); *G06F 2221/033* (2013.01)

(58) Field of Classification Search
CPC ............... G06F 21/53; G06F 2221/033; G06F 9/45558; G06F 21/602
See application file for complete search history.

(56) References Cited

U.S. PATENT DOCUMENTS

| | | | |
|---|---|---|---|
| 12,019,759 B2* | 6/2024 | Johannus Michiels | G06F 21/79 |
| 2013/0151846 A1* | 6/2013 | Baumann | H04L 9/3263 713/168 |
| 2020/0057664 A1* | 2/2020 | Durham | G06F 21/53 |
| 2020/0159677 A1* | 5/2020 | Evans | G06F 12/0811 |
| 2023/0103518 A1* | 4/2023 | Rogers | G06F 21/53 726/26 |
| 2023/0418643 A1* | 12/2023 | Tsirkin | G06F 9/45558 |

* cited by examiner

*Primary Examiner* — Joe Chacko
(74) *Attorney, Agent, or Firm* — Lowenstein Sandler LLP (57) ABSTRACT

The technology disclosed herein enables selective clearing of memory regions upon a context switch. An example method includes the operations of: receiving a memory access request referencing a memory region; determining an identifier of a current execution context associated with the memory region; determining an identifier of a previous execution context specified by metadata associated with the memory region; responsive to determining that the identifier of the current execution context does not match the identifier of the previous execution context, updating the metadata associated with the memory region to store the identifier of the current execution context; clearing at least a part of the memory region; and processing the memory access request with respect to the memory region.

20 Claims, 5 Drawing Sheets

MAINTAINING DATA CONFIDENTIALITY IN SHARED COMPUTING ENVIRONMENTS

TECHNICAL FIELD

The present disclosure generally relates to shared computing environments, and more specifically relates to maintaining data confidentiality in shared computing environments.

BACKGROUND

Various shared computing environments (e.g., virtualized execution environments) may be used to run confidential computing workloads, which are isolated from each other as well as from the respective host environments.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Trusted execution environments (TEEs) are widely used to host confidential computing (CC) workloads by isolating them from each other and from the hosting environments. In an illustrative example, the TEE may be implemented by an Intel® Software Guard Extensions (SGX) secure enclave, which is a private region of encrypted memory, the contents of which would only be decrypted for access by the process running within the enclave. In another illustrative example, the TEE may be implemented by the AMD® Secure Encrypted Virtualization (SEV), which encrypts the memory state of each virtual machine using a respective encryption key inaccessible by other virtual machines. Various other TEE implementations for the above-referenced and/or other processor architectures may be compatible with the systems and methods of the present disclosure.

A TEE may be implemented by primary data processing devices, such as Central Processing Units (CPUs). A CPU may provide hardware-level encryption that protects the data of a process from being accessed by the operating system that manages the process. In computer systems that use hardware virtualization, an entire virtual machine (VM) may be executed within a TEE and the data of the virtual machine that is stored in the host memory may remain inaccessible to the hypervisor and the host operating system that manage the virtual machine. Since certain data processing tasks, such as input-output (I/O) and related processing operations may be offloaded from the central processing units (CPUs) to various peripheral devices, such as network interface controllers (NICs), a host-implemented TEE is expected to be extended to such devices.

As a computer system may simultaneously maintain multiple tenant execution contexts, including threads, processes, VMs, application containers, and/or other streams of execution, at least some host memory regions may be re-assigned to other execution contexts once they have been released by the current owner execution context. For example, terminating a process involves termination of all its threads, which in turn causes all their resources, such as stack and other process memory, having been released. Accordingly, in order to preserve the workload confidentiality, the memory regions released by a given execution context should be cleared before having been assigned to a new execution context. However, clearing a memory region involves overwriting it with a predefined (e.g., all zeroes) or random data pattern, which may present a significant overhead for the managing process (e.g., the operating system scheduler).

Aspects of the present disclosure address the above and other deficiencies by providing technology that selectively clears only those memory regions that have been reassigned to a new execution context. Conversely, re-assigning a memory region to its previous tenant does not compromise the data confidentiality, and thus the memory region does not need to be cleared before such re-assignment. In order to implement such selective clearing of memory regions, the scheduler tracks, by associated metadata, assignments of the execution contexts to the memory regions, as described in more detail herein below.

The technology described herein improves the field of computer security by enabling a computing device in a Confidential Computing environment (e.g., Trusted Computing environment) to provide better performance and security. In particular, aspects of the disclosed technology may improve the performance of the computing device by improving the efficiency of various auxiliary devices such as data processing units (DPUs), peripheral device controllers (e.g., network interface controllers (NICs), disk controllers, and/or infrastructure processing units (IPUs), to which a host-implemented TEE may be extended.

Various aspects of the above referenced methods and systems are described in details herein below by way of examples, rather than by way of limitation. The examples provided below discuss a computing environment that uses a combination of confidential computing and hardware level virtualization and executes virtual machines in TEEs. In other examples, the confidential computing features may be substituted with different techniques for enhancing confidentiality or integrity verification and the computing environment may include a substitute for the TEEs. In yet another example, the host device may be absent virtualization or include a different or an additional virtualized execution environment, such as container-based virtualization (e.g., operating system level virtualization).

Figure 1:
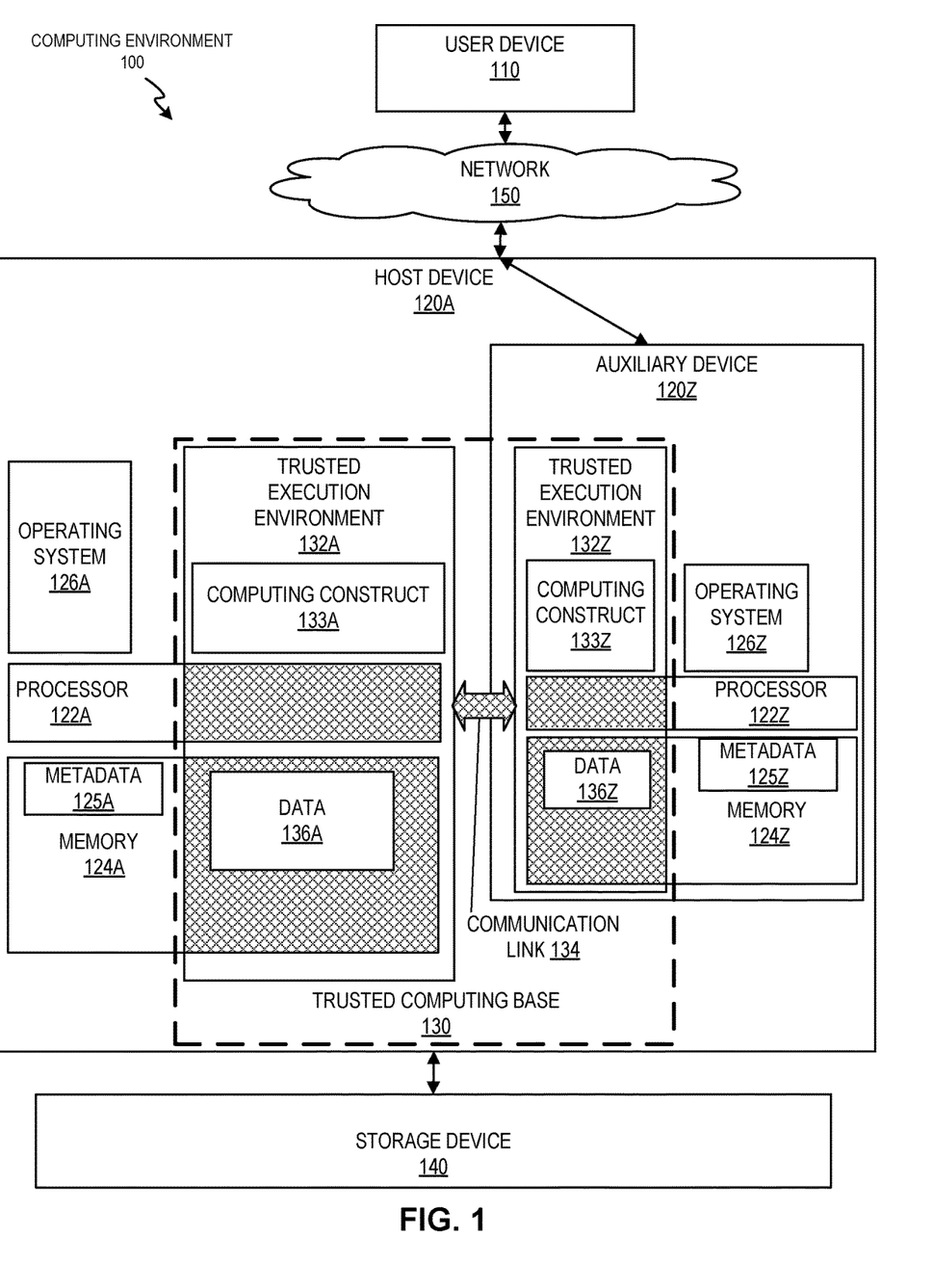
FIG. 1 depicts a high-level architecture of an example computing environment operating in accordance with one or more aspects of the present disclosure.

FIG. 1 depicts a high-level architecture of an example computing environment 100 operating in accordance with one or more aspects of the present disclosure. The implementation of a computing environment utilizing embodiments of the disclosure are not necessarily limited to the specific architecture depicted. Computing environment 100 may be configured to provide on-demand availability of computing resources to consumers without direct management by the consumers. In one example, computing environment 100 may be a cloud computing environment (e.g., public cloud, private cloud, hybrid cloud) because the user devices and host devices may be associated with different entities (e.g., cloud consumer or cloud provider). In another example, computing environment 100 may be an on-premise computing environment, in which the user devices and host devices are associated with the same entity (e.g., same company or enterprise). In the simplified example of FIG. 1, computing environment 100 may include a user device 110, a host device 120A, an auxiliary device 120Z, a trusted computing base 130, a persistent storage device 140, and a network 150.

User device 110 may be any computing device that consumes the computing resources of a host device 120A and may provide input data (e.g., code or configurations) that enable the host device 120A to execute computing tasks on behalf of user device 110. User device 110 may include one or more servers, workstations, desktop computers, laptop computers, tablet computers, mobile phones, robotic devices (e.g., drones, autonomous vehicles), personal digital assistants (PDAs), smart watches, other device, or a combination thereof.

Host device 120A may be a single host machine or multiple host machines arranged in a heterogeneous or homogenous group (e.g., cluster). In one example, host device 120A may be or include one more servers, workstations, personal computers (e.g., desktop computers, laptop computers), mobile computers (e.g., mobile phones, palm-sized computing devices, tablet computers, personal digital assistants (PDAs)), network devices (e.g., routers, switches, access points), data storage devices (e.g., USB drive, Network Attached Storage (NAS), Storage Area Network (SAN)), other devices, or a combination thereof.

Host device 120A may include one or more primary devices that include one or more processors 122A and memory 124A. Processor 122A may be or include a Central Processing Unit (CPU) and may be referred to as the primary processor, host processor, main processor, other term, or a combination thereof. Processor 122A may have an Instruction Set Architecture (ISA) that is the same or similar to x86, ARM, Power ISA, RISC-V, SPARC, MIPS, other architecture, or a combination thereof. Processor 122A may be coupled to memory 124A and memory 124A may be shared by one or more devices of host device 120A and may be referred to as main memory, host memory, primary memory, other term, or a combination thereof. Host device 120A may include or be associated with one or more auxiliary devices 120Z.

An auxiliary device 120Z may be a computing device that is communicably coupled with host device 120A and may perform one or more data processing tasks for host device 120A. Auxiliary device 120Z may be internal or external to host device 120A and may be implemented as a physical adapter, card, component, module, or other device that is physically located on the same chassis as host device 120A (e.g., same board, case, tower, rack, cabinet, room, building) or on a different chassis. Auxiliary device 120Z may perform data processing tasks that are the same or similar to the data processing tasks performed by processor 122A or may perform data processing tasks that are not performed by processor 122A. The data processing tasks performed by auxiliary device 120Z may involve or be related to data transmission (e.g., over a network), data encryption (e.g., encrypting or decrying), data verification (e.g., integrity verification, error checks), data storage (e.g., storing or accessing), data compression (e.g., compress or decompress), data transfer (e.g., sending or receiving), data formatting (e.g., encoding or decoding), data analysis (e.g., forensic analysis), other data processing task, or a combination thereof. Auxiliary device 120Z may perform the data processing tasks using processor 122Z and memory 124Z.

Processor 122Z may supplement the data processing functions of the primary processor 122A and may be referred to as an auxiliary processor, coprocessor, other term, or a combination thereof. In one example, processor 122Z may be similar to processor 122A and may operate as a Central Processing Unit (CPU) of auxiliary device 120Z. The instruction set architecture of processor 122Z may be the same or different from the instruction set architecture of processor 122A and may be the same or similar to ARM, RISC-V, Power ISA, x86, other standardized or proprietary ISA, or a combination thereof. In another example, processor 122Z may be or include one or more Application Specific Integrated Circuits (ASICs), Field Programmable Gate Arrays (FPGAs), microprocessors, bus controllers, peripheral device controllers, or other processing devices. In either example, processor 122Z may include or manage one or more hardware accelerators and use memory 124Z to store data.

Memory 124Z may be coupled with processor 122Z of auxiliary device 120Z and may be referred to as auxiliary memory, device memory, other term, or a combination thereof. In one example, memory 124Z may be separate from memory 124A and may be exclusive to auxiliary device 120Z (e.g., discrete memory). In another example, memory 124Z may be a part of memory 124A (e.g., integrated with main memory).

Auxiliary device 120Z may be represented by a Data Processing Unit (DPU). The data processing unit may contain one or more central processing devices (e.g., CPUs, ASICS, FPGAs), network controllers (e.g., NICs), programmable data acceleration engines (e.g., encryption engine, compression engine, or other engine), other computing resources, or a combination thereof. The data processing unit may have the generality and the programmability of a more traditional CPU while being specialized to operate more efficiently for data processing tasks that involve cryptographic operations (e.g., encryption, hashing), storage operations (e.g., write/read requests), networking operations (e.g., network requests), memory operations (e.g., store/access requests), or a combination thereof.

In one example, the data processing unit may use Multiple Instruction, Multiple Data (MIMD) architecture rather than a Single Instruction/Multiple Data (SIMD) architecture. The MIMD architecture may be a hardware architecture that provides a set of processing cores that function asynchronously and independently. At any time, different processing cores may be executing different instructions on different pieces of data. The processing cores may access memory using a bus, mesh, hypercube, or hierarchical access technique.

In other embodiments, auxiliary device 120Z may be or include one or more Infrastructure Processing Units (IPU), Smart Network Interface Controller (NIC), storage controller (e.g., Hard Drive Device (HDD) controller or Solid-State Storage Drive (SSD) controller), Tensor Processing Unit (TPU), Graphical Processing Units (GPUs), other data processing device, or a combination thereof. The hardware and programming of auxiliary device 120Z and host device 120A may support confidential computing and may be used to establish a trusted computing base 130.

Trusted Computing Base (TCB) 130 may be the portion of a computing environment 100 that is trusted by a particular computing resource. The particular computing resource may be a program or device that is internal to computing environment 100 or external to computing environment 100 and may be referred to as the trusting resource because it trusts the trusted resource. The trusting resource may establish a trust relationship with the trusted resource by verifying the trusted resource.

The trusted resource may be a set of computing resources of host device 120A, auxiliary device 120Z, persistent storage device 140, other device, or a combination thereof. The set of computing resources may include portions of hardware resources (e.g., hardware interfaces, processors, interconnects, memory, or other integrated circuits), portions of software resources (e.g., programming interfaces, executable code, firmware, drivers, services, kernels, operating systems, application, or other program), or a combination thereof. After the trusted computing base is established, it may be modified to extend (e.g., expand) or retract (e.g., shrink) the set of trusted computing resources. In the example illustrated in FIG. 1, trusted computing base 130 may initially include the computing resources of trusted execution environment 132A (e.g., primary processor and main memory) and trusted computing base 130 may be expanded to include trusted communication link 134 and trusted execution environment 132Z (e.g., auxiliary processor and memory).

Trusted execution environments 132A-Z (TEEs) may each enable confidential computing by including a set of computing resources that are configured to protect data using techniques that enhance data confidentiality, data integrity, or a combination thereof. Trusted execution environments 132A-Z may protect the data using hardware based encryption that isolates the data of one or more computing processes (e.g., application, container, VM) from other processes running on the same computing device. In one example, the data of a process executing in the trusted execution environment may be encrypted using cryptographic keys that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data in memory. This enables the trusted execution environment to isolate data of a lower privileged process (e.g., virtual machine process) executing within the trusted execution environment from being accessed by a higher privileged processes (e.g., hypervisor or host OS) even though the higher privileged processes may be responsible for managing the lower privileged process. A trusted execution environment may provide code execution while enforcing data integrity and confidentiality.

Trusted execution environments 132A and 132Z may each correspond to a different set of computing resources (e.g., sub-set of trusted computing base 130). In the example illustrated in FIG. 1, trusted execution environment 132A may have a set of computing resources that include the primary device of host device 120A and include a portion of processor 122A (e.g., host processor) and a portion of memory 124A (e.g., main memory) and may be described as the primary TEE, host TEE, main TEE, CPU-TEE, other term, or a combination thereof. Trusted execution environment 132Z may include computing resources of auxiliary device 120Z and include a portion of processor 122Z (e.g., auxiliary processor) and a portion of memory 124Z (e.g., auxiliary memory) and may be described as the auxiliary TEE, device TEE, DPU-TEE, other term, or a combination thereof. In some implementations, memories 124A-124Z may store respective metadata 125A-125Z, which may be utilized for tracking the assignments of memory frames to execution contexts, as described in more detail herein below with reference to FIGS. 2-4.

Trusted communication link 134 may enable the data of a trusted execution environment to be transmitted between trusted execution environments in a security enhanced manner. For example, trusted communication link 134 may enable data 136A of trusted execution environment 132A to be accessed by trusted execution environment 132Z and stored as data 136Z within trusted execution environment 132Z. Trusted communication link 134 may include or traverse one or more interconnects, buses, networks, other communication link, or a combination thereof. Data transmitted over trusted communication link 134 may be encrypted or partially encrypted during transit. This may be advantageous because transmitting data 136A in an encrypted form may limit the ability of data 136A to be snooped while being transmitted between computing resources of different trusted execution environments (e.g., between processor 122A and processor 122Z).

Transmitting data between trusted execution environments 132A and 132Z may involve one or more changes to the data encryption being used. In one example, the data may be encrypted using a first cryptographic technique (e.g., a first key) when stored in memory 124A, a second cryptographic technique when transmitted over trusted communication link 134 (e.g., a second key), and a third cryptographic technique when stored in memory 124Z (e.g., a third key). When switching between cryptographic techniques the data may be decrypted and then encrypted. In another example, the data that is stored in memory 124A may be encrypted using a cryptographic technique that is available to both trusted execution environments and may be accessed without changing the encryption.

Trusted execution environments 132A-Z may be ephemeral execution environments that store data using non-persistent data storage resources. The non-persistent data storage may include data storage devices that lose data in response to an interruption and may include volatile memory (e.g., main memory), processor cache (e.g., CPU Cache), processor registers (e.g., CPU registers), other non-persistent cache, or a combination thereof. The technology disclosed herein may enable a first trusted execution environment (e.g., Primary TEE 132A) to use a second trusted execution environment (e.g., auxiliary TEE 132Z) to store data (e.g., data 136A) on persistent storage device 140.

Persistent storage device 140 may include persistent data storage that does not lose data in response to a power cycle and may include one or more hard disk storage devices (e.g., Hard Disk Drives (HDD)), solid-state storage devices (e.g., Solid State Drives (SSDs)), tape drive storage devices, network storage devices, other persistent data storage medium, or a combination thereof. Persistent storage device 140 may be internal to host device 120A and accessible over a device bus or may be external to host device 120A and accessible over a network connection (e.g., communication link). Persistent storage device 140 may include one or more block-based storage devices, file-based storage devices, or a combination thereof. Block-based storage devices may provide access to consolidated block-based (e.g., block-level) data storage. File-based storage devices may provide access to consolidated file-based (e.g., file-level) data storage. In either example, the data of a trusted execution environment (e.g., Trusted VM) may be transmitted to and stored by persistent storage device 140.

Trusted execution environments 132A-Z may each have the same or different levels of granularity and protect a respective computing context 133A-Z. The level of granularity of a TEE may depend on the computing context that is being protected may be a Virtual Machine (VM), a container, a process, a thread, other stream of execution, or a combination thereof. A trusted execution environment for executing and protecting a VM may be referred to as Trusted Virtual Machine (TVM). A trusted execution environment for executing and protecting a container may be referred to as a Trusted Container (TC). A trusted execution environment for executing and protecting an application process may be referred to as a Trusted Application (TA) or Trusted Process (TP). In one example, trusted execution environment 132A may be established by host processor 122A and include a virtual machine or container and trusted execution environment 132Z may be established by auxiliary processor 122Z and be a TEE for one or more processes (e.g., processes managing encryption and persistent storage).

Computing environment 100 may include devices that support one or more levels of virtualization. The levels of visualization may include hardware level virtualization (e.g., VMs), operating system level virtualization (e.g., containers), other virtualization, or a combination thereof. Hardware level virtualization may involve the computing device (e.g., 120A, 120Z) running an operating system (e.g., 120A, 120Z) that supports a hypervisor (e.g., Virtual Machine Monitor (VMM)). The hypervisor may provide and manage hardware resources for use by one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine.

Network 150 may include one or more public networks (e.g., the internet), private networks (e.g., a local area network (LAN), wide area network (WAN)), or a combination thereof. In one example, network 150 may include a wired or a wireless infrastructure, which may be provided by one or more wireless communications systems, such as a wireless fidelity (WiFi) hotspot connected with the computer network 150 and/or a wireless carrier system that may be implemented using various data processing equipment, communication towers, etc.

Figure 2:
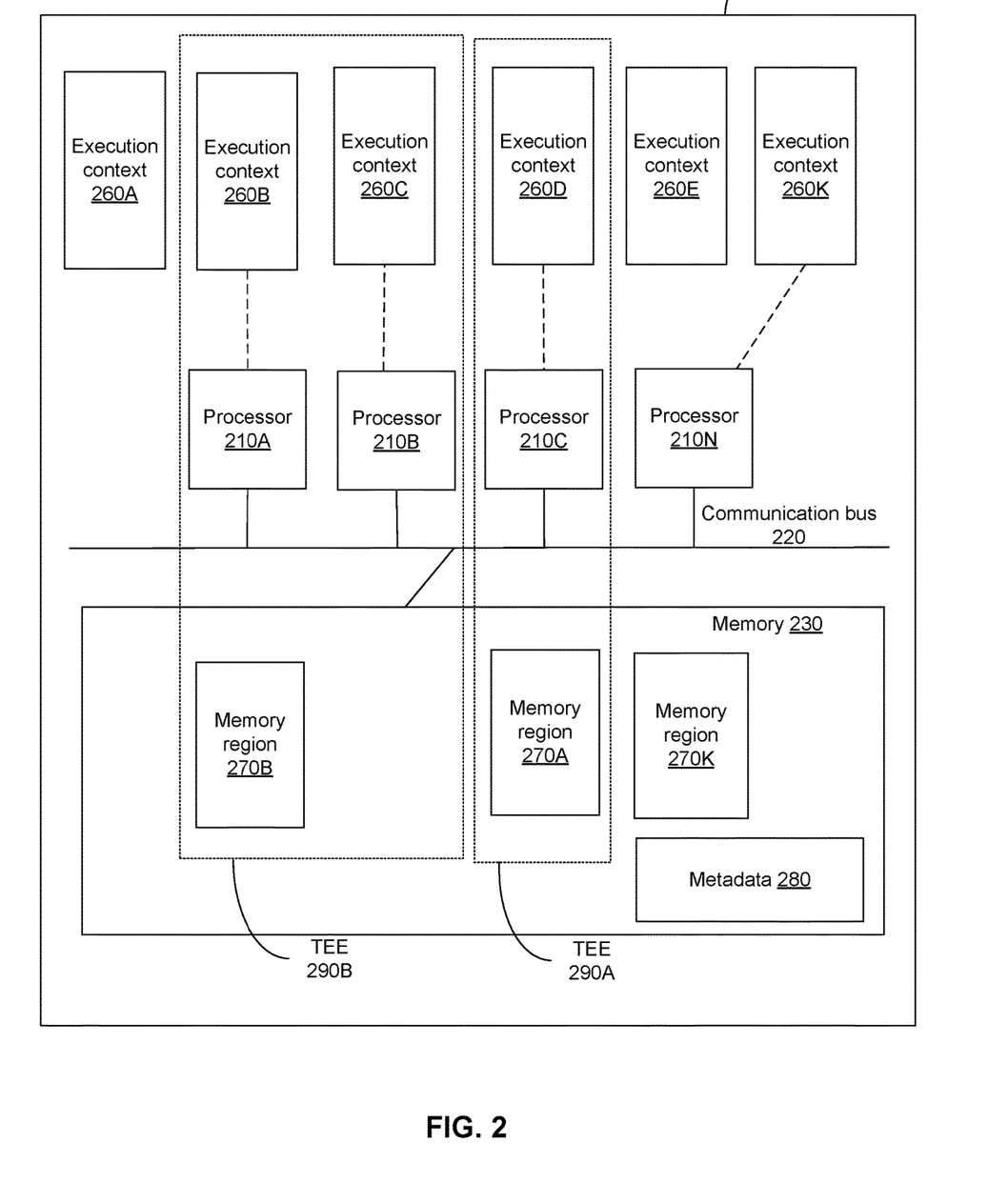
FIG. 2 depicts an example high-level architecture of one or more components of the example computing environment of FIG. 1.

FIG. 2 depicts an example high-level architecture 200 of one or more components of the example computing environment of FIG. 1. In some implementations, the high-level architecture corresponds to the host device 120A and/or auxiliary device 120Z of FIG. 1. Other architectures for the computing environments described herein are possible, and that the implementation of a computing environment utilizing embodiments of the disclosure are not necessarily limited to the specific architecture depicted. One or more components of the architecture 200 may be implemented, e.g., by a computing device (ranging from a wearable device to a hardware server) equipped with one or more processors 210A-210N, which may include any combination of central processing units (CPUs), graphic processing units (GPUs), data processing units (DPUs), and specialized processing units such as peripheral device controllers (e.g., network interface controllers (NICs), disk controllers, and/or infrastructure processing units (IPUs). The processors 210A-210N may be coupled, by one or more communication buses 220 of suitable architecture(s), to the system memory 230, which may be implemented by one or more memory devices (e.g., random access memory (RAM) devices). In some implementations, components of the architecture 200 may further include one or more storage devices and/or one or more peripheral devices (omitted from FIG. 2 for clarity and conciseness).

Each processor 210 may implement one or more execution contexts 260. "Execution context" herein shall refer to one or more runnable sequences of executable instructions that are grouped together by at least partly shared execution state (including the processor state, the memory state, and the input/output (I/O) controller state). Accordingly, in various implementations, an execution context 260 may be represented by a thread, a process, a virtual machine (VM), an application container, or other runnable sequence of executable instructions.

In an illustrative example, an execution context 260 may be represented by a single execution thread, which is a sequence of executable instructions that has its own execution state and may be scheduled (e.g., by a scheduler of an operating system) to run on a computer system separately from other threads. In some implementations, two or more threads may be joined together to form an executable process. Thus, in another illustrative example, an execution context 260 may be represented by an executable process. The executable threads and/or processes may be managed by a privileged component of an operating system (OS).

In yet another illustrative example, an execution context 260 may be represented by a VM managed by a hypervisor running on a host computer system that implements one or more elements of the example architecture 200. The hypervisor may be represented, e.g., by a virtual machine monitor (VMM) facilitating execution of one or more VMs, each of which may run a guest OS managing one or more applications. The hypervisor may provide, to one or more VMs, seamless interfaces to the underlying hardware platform, including processors, memory, and peripheral devices (such as network interface controllers, hard disk controllers, etc.). For example, a virtual processor of a virtual machine may be implemented by an execution thread scheduled to run on a corresponding processor 210 of the host computer system. In some implementations, the hypervisor may be executed at an elevated privilege level as compared to the privilege level of the VMs, thus retaining control of the hardware platform resources.

In another illustrative example, an execution context 260 may be represented by an application container, which is an isolated process running in the userspace of the host operating system and sharing the kernel with other containers running on the same host. Each container may be constrained to use only a defined set of computing resources (e.g., CPU, memory, I/O). In some implementations, a containerized application may be wrapped in a complete file system that contains the executable code and runtime dependencies including, e.g., middleware and system libraries.

One or more components of the architecture 200 may implement one or more TEEs (TEE) 290, such that each TEE 290 may include one or more execution contexts 260. In the illustrative example of FIG. 2, the TEE 290A includes the execution context 260D, and the TEE 290B includes the execution contexts 260B-260C. Each TEE 290 may enable running confidential computing (CC) workloads within the respective execution context(s) 260, while providing the data integrity and confidentiality. In some implementations, a TEE 290 may employ hardware-based encryption for cryptographically protecting the state of its execution context(s) 260. The hardware-based encryption techniques implemented by a processor 220 for cryptographically protecting the state of a corresponding execution context 260 may utilize cryptographic keys that are not accessible to any other components of the architecture 200. In an illustrative example, the TEE may be implemented by an Intel® Software Guard Extensions (SGX) secure enclave, which is a private region of encrypted memory, the contents of which would only be decrypted for access by the process running within the enclave. In another illustrative example, the TEE may be implemented by the AMD® Secure Encrypted Virtualization (SEV), which encrypts the memory state of each virtual machine using a respective encryption key inaccessible by other virtual machines. Various other TEE implementations for the above-referenced and/or other processor architectures may be compatible with the systems and methods of the present disclosure.

Since multiple execution contexts 260A-260K may be running simultaneously on respective processors 210A-210N, they may simultaneously access the memory 230. Each execution context 260A-260K may, at any given time, utilize one or more memory regions, such that each memory region 270 is assigned to the tenant execution context 260. The memory regions 270 utilized by execution contexts carrying confidential computing workloads should be isolated from other execution contexts, including privileged execution contexts (e.g., from virtual machine managers, which are not considered as part of TEEs).

In various illustrative examples, the memory regions 270 may be represented, e.g., by cache lines, stack frames, heap frames, video memory frames, peripheral device memory frames, etc. "Memory frame" herein shall refer to a region of memory of a certain size. In some implementations, the size of the memory frame may be chosen to match the size of a cache line, thus allowing the memory region to execution context assignment metadata tags to be stored together with the respective cache line metadata.

Notably, at least some memory regions 270 of a given execution context 260 may be assigned to other execution contexts once they have been released by the owner execution context 260. For example, terminating a process involves termination of all its threads, which in turn causes all their resources, such as stack and other process memory, having been released. Accordingly, in order to preserve the workload confidentiality, the memory regions released by a given execution context should be cleared before having been assigned to a new execution context, thus preventing exposure of the content of the memory region to any execution context to which the memory regions may eventually be re-assigned.

As noted herein above, clearing a memory region involves overwriting it with a predefined (e.g., all zeroes) or random data pattern, which may present a significant overhead for the scheduler. In order to reduce such overheads, a memory region may only be cleared when it is reassigned to a new execution context (i.e., to an execution context that is different from the execution context that was the immediate previous tenant of the memory region). Conversely, re-assigning a memory region to its previous tenant (i.e., to the execution context that was the immediate previous tenant of the memory region) does not compromise the confidentiality, and thus the memory region does not need to be cleared before such re-assignment.

In some implementations, the selected clearing operation may be performed before the memory access request reaches the processor or the main memory, e.g., by a bus controller or mesh controller that could intercept the request and initiate the selective clearing operation based on the request type.

In order to implement such selective clearing of memory regions, the relevant processing device (e.g., a processor, a bus controller, or a mesh controller) may track, for each memory region, the current execution context that is exclusively associated with the memory region. In some implementations, tracking the assignments of memory frames to execution contexts may be facilitated by memory region to execution context assignment metadata 280, as described in more detail herein below with references to FIG. 3.

Figure 3:
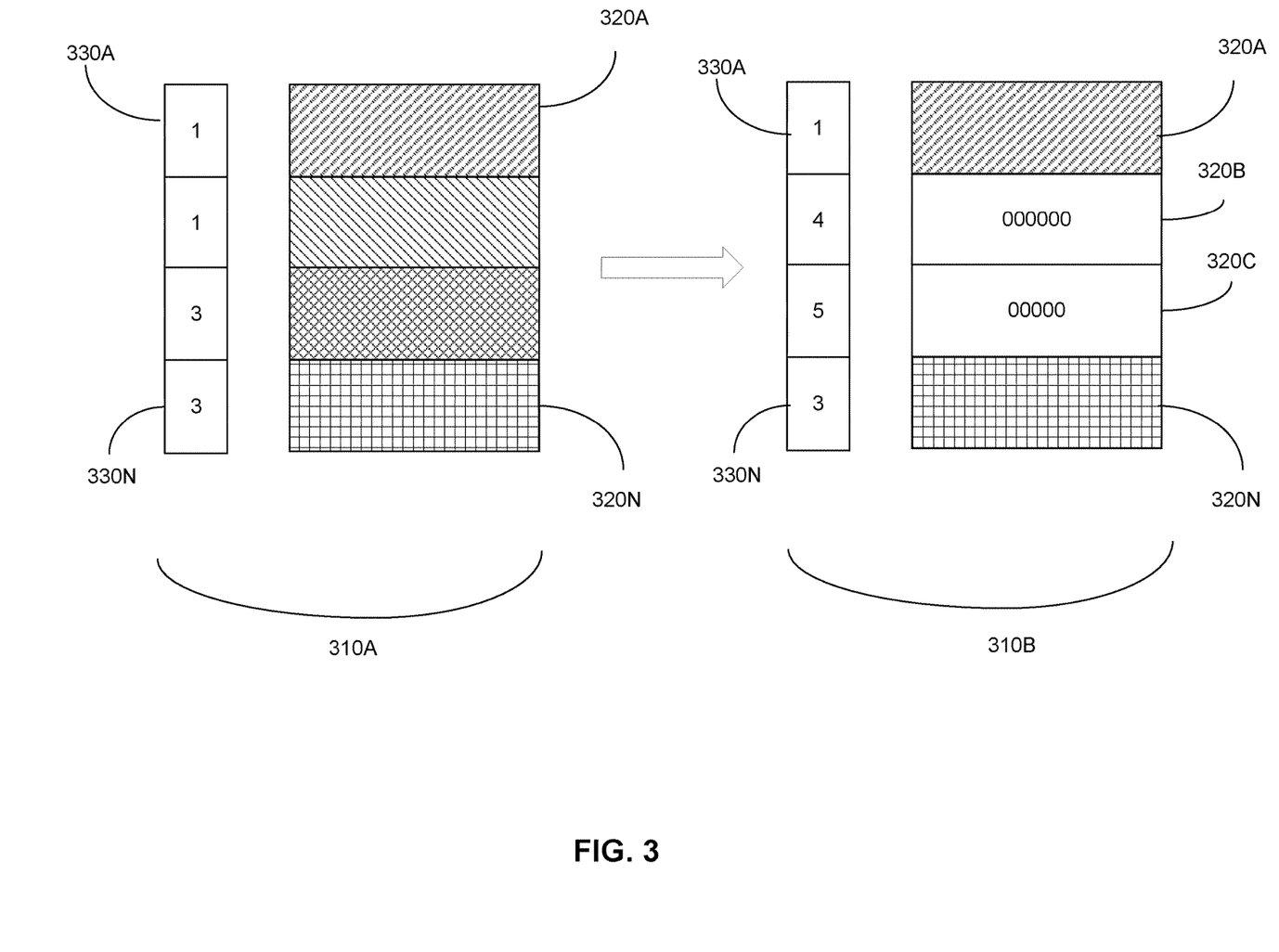
FIG. 3 schematically illustrates dynamic reassignment with selective clearing of memory regions implemented by systems and methods of the present disclosure, in accordance with one or more aspects of the present disclosure.

FIG. 3 schematically illustrates dynamic reassignment with selective clearing of memory regions implemented by systems and methods of the present disclosure in accordance with one or more aspects of the present disclosure. FIG. 3 shows the partial memory states 310A and 310B before and after the re-assignment of memory regions 320A-320N. Each memory region 320A-320N is associated with a respective memory region to execution context assignment metadata tag 330A-330N, which stores the identifier of the execution context to which the memory region is currently assigned.

As schematically illustrated by FIG. 3, the memory regions 320A-320N may initially (as reflected by the partial memory state 310A) be associated with the respective execution contexts whose identifiers are stored as memory region to execution context assignment metadata tags 330A-330N. The memory regions 320A-320N may subsequently (as reflected by the partial memory state 310B) be re-assigned to new the respective execution contexts. Accordingly, memory region to execution context assignment metadata tags 330A-330N may be updated to store the identifiers of the new execution contexts.

Each memory region that has been re-assigned to a new execution context (i.e., to an execution context that is different from the execution context that was the immediate previous tenant of the memory region) may be cleared immediately before re-assignment. This applies to, e.g., memory regions 320B and 320C.

Conversely, each memory region that has been re-assigned to its previous tenant (i.e., to the execution context that was the immediate previous exclusive tenant of the memory region) may not need to be cleared before such re-assignment. This applies to, e.g., memory regions 330A and 330N.

Thus, once a new execution context is scheduled to be executed on a specific hardware thread (e.g., a processor core), its corresponding memory regions may be selectively cleared based on the result of comparing, for each memory region, the identifier of the newly scheduled execution context to the identifier of the execution context that has been previously associated with the memory region (i.e., the identifier stored by the corresponding memory region to execution context assignment metadata tag). If the two identifiers match, the memory region may be re-assigned without the intervening clearing operation, since the same execution context is allowed to access its previously computed data. Conversely, should the two identifiers be different, the memory region may be cleared before completing the re-assignment to the new memory region.

In some implementations, the clearing may only be performed for read or partial write memory access requests by the new memory region, since for a write access request affecting the whole region, the content of the region will be overwritten by performing the request.

Figure 4:
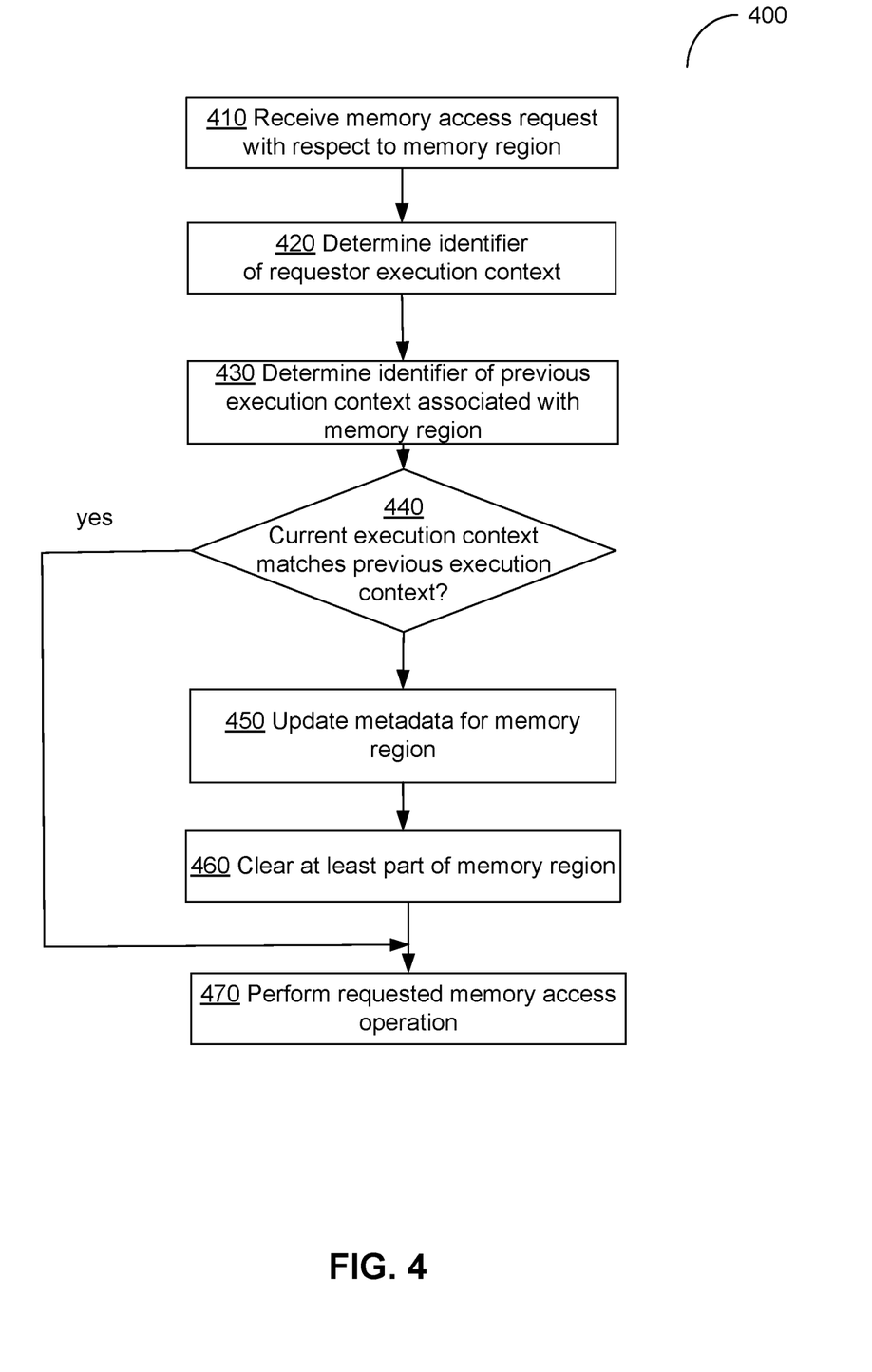
FIG. 4 is a flowchart of a method 400 of selectively clearing reassigned memory regions, in accordance with one or more aspects of the present disclosure.

FIG. 4 is a flowchart of a method 400 of selectively clearing reassigned memory regions, in accordance with some embodiments of the present disclosure. Method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes may be modified. Thus, the illustrated embodiments should be understood only as examples, and the illustrated processes may be performed in a different order, and some processes may be performed in parallel. Additionally, one or more processes may be omitted in various embodiments. Thus, not all processes are required in every embodiment. Method 400 may be performed by processing logic of an auxiliary device 120Z, host device 120A, other device, or a combination thereof.

At operation 410, the processing logic implementing the method receives a memory access request specifying a type of the memory access operation requested (e.g., read, write) and referencing a memory region. In an illustrative example, the memory access request may specify a virtual address of the memory region in the virtual address space of the requestor. Accordingly, the processing logic may translate the virtual address into a corresponding physical address (e.g., using an address translation table, each record of which maps a virtual address into a corresponding physical address).

At operation 420, the processing logic determines an identifier of the requestor execution context, which is the current execution context associated with the memory region. In an illustrative example, the processing logic may identify the current thread associated with the requested physical address through an address mapping table. Other platform-specific and operating system-specific techniques of identifying the current thread may be utilized.

At operation 430, the processing logic determines an identifier of the previous execution context associated with the memory region. The processing logic may use the memory region to execution context assignment metadata, which stores the identifier of the execution context to which the memory region is currently assigned, as described in more detail herein above.

Responsive to determining, at operation 440, that the identifier of the current execution context does not match the identifier of the previous execution context, the processing logic, at operation 450, updates the memory region to execution context assignment metadata associated with the memory region to store the identifier of the current execution context, as described in more detail herein above.

At operation 460, the processing logic clears at least a part of the memory region. In an illustrative example, responsive to determining that the requested memory access operation is a read operation, the processing logic clears the whole memory region. In another illustrative example, responsive to determining that the requested memory access operation is a partial write operation (i.e., the write operation to be performed with respect to a part of the memory region), the processing logic clears the affected part of the memory region. In yet another illustrative example, responsive to determining that the requested memory access operation is to be performed with respect to the whole memory region, the processing logic skips the clearing operation and the processing continues at operation 470.

At operation 470, the processing logic processes the memory access request with respect to the memory region. In various illustrative examples, the processing logic performs the requested read or write operation with respect to the memory region. Responsive to completing the operations described herein above with references to operation 480, the method may terminate.

Figure 5:
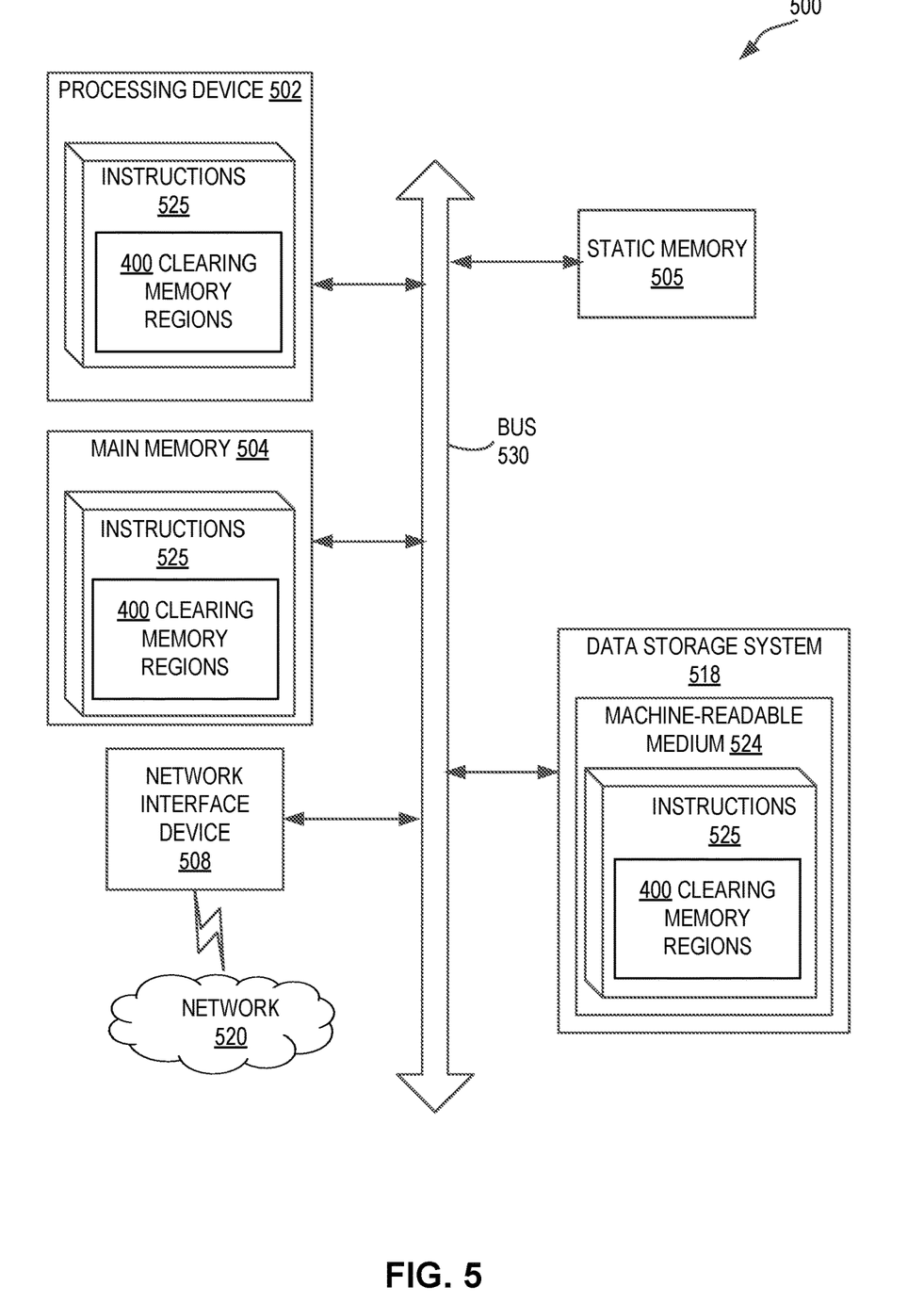
FIG. 5 depicts a block diagram of an example computing system operating in accordance with the examples of the present disclosure.

FIG. 5 illustrates an example machine of a computer system 500 within which a set of instructions, for causing the machine to perform any one or more of the methodologies discussed herein, may be executed. In some embodiments, the computer system 500 may be a computing device that includes a processor with a cache controller, a memory controller, or combination thereof. In alternative embodiments, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502 (e.g., Processor 122), a main memory 504 (e.g., read-only memory (ROM), flash memory, dynamic random access memory (DRAM) such as synchronous DRAM (SDRAM), etc.), a static memory 505 (e.g., flash memory, static random access memory (SRAM), etc.), and a data storage system 518, which communicate with each other via a bus 530.

Processing device 502 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, bus controller, peripheral device controller, or the like. The processing device 502 is configured to execute instructions 525 for performing the operations and steps discussed herein. The computer system 500 may further include a network interface device 508 to communicate over the network 520.

The data storage system 518 may include a machine-readable storage medium 524 (also known as a non-transitory computer-readable medium) on which is stored one or more sets of instructions 525 or software embodying any one or more of the methodologies or functions described herein. The instructions 525 may also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 may correspond to memory 124A of FIG. 1.

In one embodiment, the instructions 525 include instructions to the method 400 of selectively clearing reassigned memory regions, as schematically illustrated by FIG. 4. While the machine-readable storage medium 524 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications may be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory;
   a processing device, communicably coupled to the memory, the processing device to perform operations comprising:
      receiving a memory access request referencing a memory region;
      determining an identifier of a current execution context associated with the memory region;
      determining an identifier of a previous execution context specified by metadata associated with the memory region;
      responsive to determining that the identifier of the current execution context does not match the identifier of the previous execution context, updating the metadata associated with the memory region to store the identifier of the current execution context;
      clearing at least a part of the memory region; and
      processing the memory access request with respect to the memory region.

2. The system of claim 1, wherein clearing at least a part of the memory region is performed responsive to determining that a type of the memory access request is one of: a read request or a partial write request.

3. The system of claim 1, wherein the memory region is represented by one of: a cache line, a memory page, a frame of a main memory, a frame of a stack, or a frame of a heap.

4. The system of claim 1, wherein the current execution context is one of a thread or a process.

5. The system of claim 1, wherein the current execution context is one of: a virtual machine or a container.

6. The system of claim 1, wherein the current execution context is a trusted execution environment.

7. The system of claim 1, wherein the processing device is one of: a central processing unit (CPU), a network interface controller (NIC), a data processing unit DPU, or a graphic processing unit (GPU).

8. A method, comprising:
receiving, by a processing device, a memory access request referencing a memory region;
determining an identifier of a current execution context associated with the memory region;
determining an identifier of a previous execution context specified by metadata associated with the memory region;
responsive to determining that the identifier of the current execution context does not match the identifier of the previous execution context, updating the metadata associated with the memory region to store the identifier of the current execution context;
clearing at least a part of the memory region; and
processing the memory access request with respect to the memory region.

9. The method of claim 8, wherein clearing at least a part of the memory region is performed responsive to determining that a type of the memory access request is one of: a read request or a partial write request.

10. The method of claim 8, wherein the memory region is represented by one of: a cache line, a memory page, a frame of a main memory, a frame of a stack, or a frame of a heap.

11. The method of claim 8, wherein the current execution context is one of a thread or a process.

12. The method of claim 8, wherein the current execution context is one of: a virtual machine or a container.

13. The method of claim 8, wherein the current execution context is a trusted execution environment.

14. The method of claim 8, wherein the processing device is one of: a central processing unit (CPU), a network interface controller (NIC), a data processing unit DPU, or a graphic processing unit (GPU).

15. A non-transitory machine-readable storage medium storing instructions which, when executed, cause a processing device to perform operations comprising:
receiving a memory access request referencing a memory region;
determining an identifier of a current execution context associated with the memory region;
determining an identifier of a previous execution context specified by metadata associated with the memory region;
responsive to determining that the identifier of the current execution context does not match the identifier of the previous execution context, updating the metadata associated with the memory region to store the identifier of the current execution context;
clearing at least a part of the memory region; and
processing the memory access request with respect to the memory region.

16. The non-transitory machine-readable storage medium of claim 15, wherein clearing at least a part of the memory region is performed responsive to determining that a type of the memory access request is one of: a read request or a partial write request.

17. The non-transitory machine-readable storage medium of claim 15, wherein the memory region is represented by one of: a cache line, a memory page, a frame of a main memory, a frame of a stack, or a frame of a heap.

18. The non-transitory machine-readable storage medium of claim 15, wherein the current execution context is one of a thread or a process.

19. The non-transitory machine-readable storage medium of claim 15, wherein the current execution context is one of: a virtual machine or a container.

20. The non-transitory machine-readable storage medium of claim 15, wherein the current execution context is a trusted execution environment.

* * * * *